United States Patent Office 2,750,224
Patented June 12, 1956

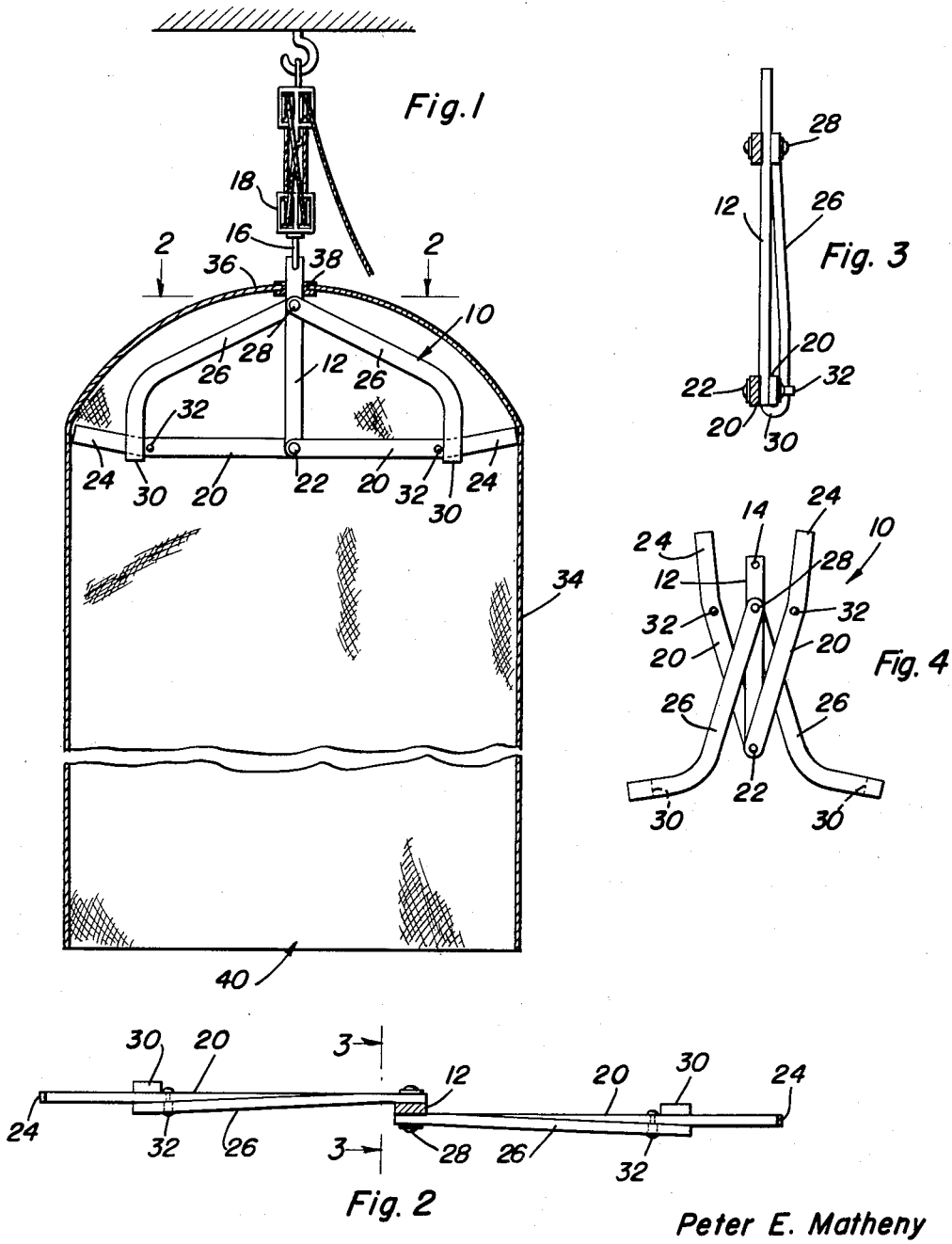

2,750,224

GAMBREL

Peter E. Matheny, Jacksonville, Oreg.

Application June 14, 1951, Serial No. 231,587

2 Claims. (Cl. 294—79)

This invention relates to new and useful improvements and structural refinements in gambrels, and the principal object of the invention is to provide a gambrel structure which can be conveniently and efficiently utilized for suspending a carcass and wherein the weight of the carcass automatically functions in opening or spreading the gambrel so that the legs of the carcass are correspondingly spread apart.

An important feature of the invention resides in the provision of means for enclosing the carcass in a bag while suspended from the gambrel, this being useful in safeguarding the carcass from contamination while it is being transported or stored.

Some of the advantages of the invention reside in its simplicity of construction, in its efficient operation, in its foldability, and in its adaptability to economical manufacture.

With the above more important objects and features in view and such other objects and features as may become apparent as this specification proceeds, the invention consists essentially of the arrangement and construction of parts as illustrated in the accompanying drawings, in which:

Figure 1 is a vertical elevational view of the invention, the enclosure thereof being shown in section, Figure 2 is a fragmentary horizontal sectional detail, taken substantially in the plane of the line 2—2 in Figure 1, with the enclosure removed, Figure 3 is a fragmentary sectional view, taken substantially in the plane of the line 3—3 in Figure 2, and Figure 4 is an elevational view of the gambrel per se in its folded position.

Like characters of reference are employed to designate like parts in the specification and throughout the several views.

Referring now to the accompanying drawings in detail, the invention consists of a gambrel which is designated generally by the reference character 10 and embodies in its construction a vertically elongated member 12 provided at its upper end with an aperture 14 whereby it may be readily suspended from a hook 16 of a tackle block 18 of any conventional type, the gambrel 10 also including in its construction a pair of arms 20 which are pivoted by a rivet or pin 22 to the lower end of the member 12, as shown.

The arms 20 extend to opposite sides of the member 12 and have upwardly angulated end portions 24 from which the rear legs of a carcass may be suspended.

A pair of keeper limbs 26 are pivoted at 28 to an intermediate portion of the member 12, the limbs 26 extending to opposite sides of the member 12 and being arcuated as shown. The free extremities of limbs 26 terminate in hooks 30, which are adapted to supportably engage lower edges of intermediate portions of the respective arms 20 when the gambrel is in its operative position as shown in Figure 1. However, by simultaneously swinging the arms 20 and the limbs 26 upwardly until the arms are disposed in V-shaped formation and the limbs are crossed over to relatively opposite sides of the member 12, the gambrel may assume a conveniently folded position, as shown in Figure 4.

In any event, suitable stop pins 32 are provided intermediate the ends of the arm 12 for abutment with the hooks 30, so as to prevent the limbs 26 from swinging too far inwardly toward the member 12, which action, if permitted, would allow the arms 20 to drop downwardly to an undesirable, inverted V-shaped formation.

In addition to the gambrel, the invention also contemplates the provision of carcass enclosing means in the form of an inverted bag 34 which envelops the gambrel and extends downwardly therefrom over the carcass, the bag 34 having a top end 36 provided with an eyelet 38 which is slidable on the upper portion of the member 12 so that the bag may be applied to the gambrel before the latter is connected to the hook 16 of the tackle block 18. It is to be noted that the outer extremities of the arms 20 engage opposite sides of the bag and thereby prevent the latter from inward collapsing.

Needless to say, after the carcass is placed on the gambrel and is enclosed by the bag 34, the open lower end 40 of the bag may be closed by a draw string, or the like.

It is believed that the advantages and use of the invention will be clearly understood from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. The combination of a gambrel comprising a vertically elongated member adapted at its upper end to be suspended from a support, and a pair of arms having inner ends pivotally connected to the lower end of said member and extending to opposite sides thereof to afford free carcass engaging outer end portions, a pair of keeper limbs pivotally connected to an intermediate portion of said member and extending to opposite sides thereof, hooks provided at free end portions of said limbs to supportably engage intermediate portions of the respective arms, a pair of stop pins provided intermediate the ends of the respective arms to abut the respective hooks, and a carcass enclosure comprising an inverted bag enveloping the gambrel and extending downwardly therefrom, said bag having a top end provided with an eyelet slidable on the upper portion of said member, and the outer extremities of said arms engaging opposite sides of said bag to sustain the same against inward collapsing.

2. A gambrel comprising an elongated member adapted to be vertically suspended from a support, a pair of arms having their inner ends pivotally connected to the lower end of said member and extending to opposite sides thereof, the outer end portions of said arms being upwardly angled and being adapted to engage portions of a carcass, a pair of keeper limbs pivotally connected to an intermediate portion of said member and extending to opposite sides thereof, hooks at the free ends of said limbs supportingly engaging intermediate portions of said arms adjacent the upwardly angled end portions thereof, and stop means on said arms engaging said limbs and limiting the movement of the free ends of said limbs toward one another.

References Cited in the file of this patent

UNITED STATES PATENTS

| 441,517 | Walker | Nov. 25, 1890 |
| 1,033,223 | Wilson | July 23, 1912 |
| 1,174,786 | Wieland | Mar. 7, 1916 |
| 2,287,912 | Laurent | June 30, 1942 |
| 2,411,856 | Hoaching | Dec. 3, 1946 |
| 2,483,631 | Fashing | Oct. 4, 1949 |